United States Patent [19]

Tokuda

[11] Patent Number: 4,896,186
[45] Date of Patent: Jan. 23, 1990

[54] LETTER IMAGE PRINTING METHOD AND APPARATUS

[75] Inventor: Kanji Tokuda, Kanagawa, Japan

[73] Assignee: Fuji Photo Film Co., Ltd., Kanagawa, Japan

[21] Appl. No.: 237,206

[22] Filed: Aug. 29, 1988

[30] Foreign Application Priority Data

Aug. 28, 1987 [JP] Japan .................................. 62-214662

[51] Int. Cl.⁴ ............................................. G03B 27/52
[52] U.S. Cl. ........................................ 355/40; 355/77
[58] Field of Search .................... 355/39, 40, 41, 46, 355/64, 65, 77

[56] References Cited

U.S. PATENT DOCUMENTS

| | | | |
|---|---|---|---|
| 4,553,833 | 11/1985 | Kanaoka et al. | 355/40 |
| 4,582,768 | 4/1986 | Takeuchi et al. | 355/40 |
| 4,607,949 | 8/1986 | Hakamada et al. | 355/40 |
| 4,782,367 | 11/1988 | Noguchi | 355/40 |

Primary Examiner—L. T. Hix
Assistant Examiner—Khanh Dang
Attorney, Agent, or Firm—Sughrue, Mion, Zinn, Macpeak & Seas

[57] ABSTRACT

An apparatus and method for printing images from a negative film onto a print, and for printing information from an information print head onto the print in the same posture as the posture of the printed image. The method and apparatus includes providing a number of information printing heads in a photographic printer, each of the information printing heads being operable for printing information onto a print in a different posture; and selectively actuating that one of the information print heads which prints information in the same posture as the posture of the image to be printed onto the print, thereby providing a print having an image and information printed in the same posture.

13 Claims, 4 Drawing Sheets

LETTER IMAGE PRINTING METHOD AND APPARATUS

FIELD OF THE INVENTION

The present invention relates to a photographic printing apparatus and method which can print letters, numerals or marks on prints upon making the prints from a negative film.

BACKGROUND OF THE INVENTION

It is popular to print a trade name, an identity mark and/or exposure data in a margin of a print. For printing letters indicating a trade name etc. and/or a mark, a letter printing head is incorporated in an exposure framing mask for defining an exposure aperture of the photographic printer for a photographic paper. The photographic printer is actuated to simultaneously print a letter image and an image of a picture frame on the photographic paper.

Meanwhile, many 35 mm format still picture cameras are provided with a patron receiving chamber and a film take-up chamber on the right and left hand sides of the camera lens, respectively, as viewed from the front of the camera. However, in recent years, it has become increasingly more popular to configure the 35 mm format still picture cameras to have a film take-up and a patron receiving chamber disposed on the right and left hand sides of the camera lens, respectively. Images on a film provided by cameras with a patron receiving chamber loaded on the left hand side of the camera lens are inverted or upside down with respect to images on a film provided by the cameras having a patron receiving chamber located on the right hand side.

In many large scaled photofinishing laboratories, a large number of negative films include inverted or upside down images and erected (upside up) images which are connected in series in the form of a long web of roll film for a bulk processing in developing and printing. For such a long web of roll film, a printed trade name or a mark will appear in a wrong posture or upside down on a print of a picture frame with an inverted image. Specifically, as is shown in FIG. 1, an letter image appears upside down with respect to a picture 3 in a margin of a print made from a picture frame which is taken by the latter type of a camera (i.e., a camera having a patron chamber located on the right side). A print having a letter image 2 which is opposite in posture to the printed picture 3 is unfavorable.

OBJECT OF THE INVENTION

It is, therefore, an object of the present invention to provide a photographic printing method in which a letter image is printed in the same posture as a printed picture on a print made from a picture frame, even with an inverted image of a negative film.

SUMMARY OF THE INVENTION

In accordance with a particular feature of the present invention, each negative film of a long web of roll film is inspected in image posture to determine whether images of picture frames thereof are erected or inverted, and data indicative of image posture for each negative film is recorded on a recording medium. Upon making prints from the negative film, the image posture data is read out from the recording medium to selectively actuate either a first letter printing head provided for erected images, or a second letter printing head provided for inverted images. Because the letter printing heads for the erected and inverted images are disposed symmetrically with respect to the center of an exposure aperture of the photographic printer, a letter image can be printed in a margin of a print in the same posture as the printed picture of the print even though picture frames of the negative film are inverted.

DETAILED DESCRIPTION OF THE INVENTION

Figure 2:
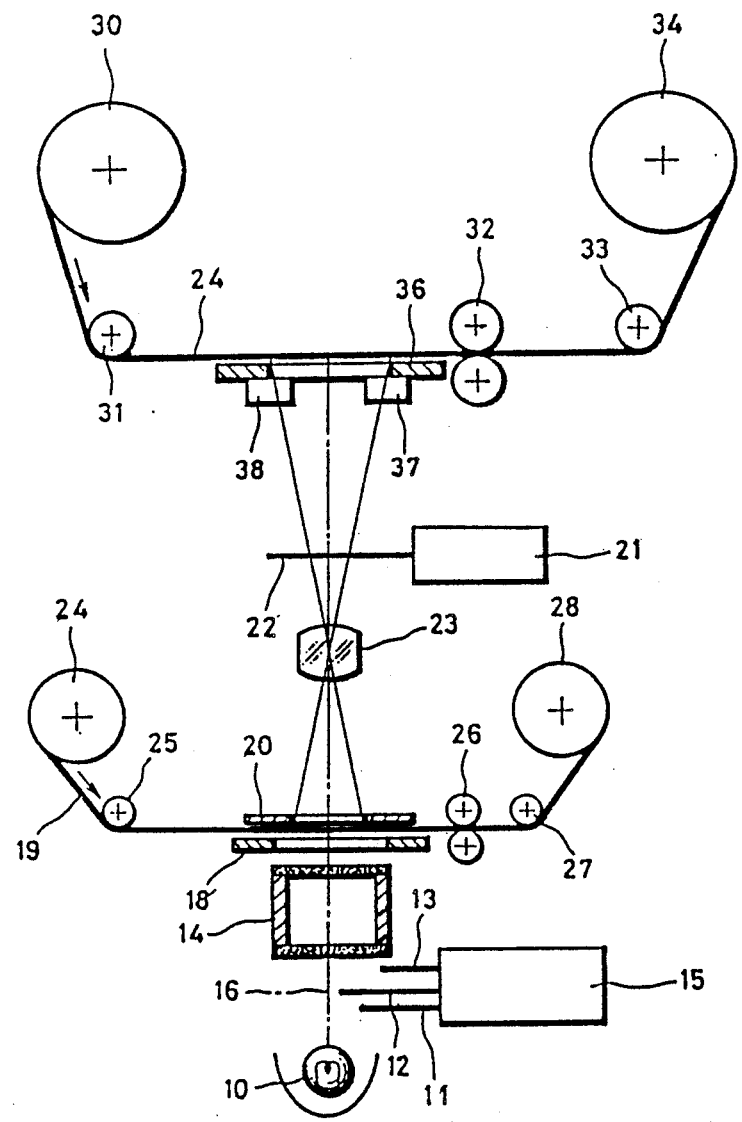
FIG. 2 is a fragmentary schematic illustration showing a photographic printer which embodies the letter printing method according to a preferred embodiment of the present invention.

Referring now to FIG. 2 which shows a photographic printer embodying the present invention, there are three complementary color filters 11, 12, 13, namely cyan, magenta and yellow. Each color filter 11, 12, 13 is controllably inserted, independently of the other two, by a control device 15 into a printing path 16 between an illumination lamp 10 and a mirror box 14 which comprises a square hollow tube having inner mirrored walls and top and bottom diffusion plates. The white light from the lamp 10 passes through the color filter 11, 12 or 13 into the mirror box 14 and is diffused thereby. The diffused light, after passing through a picture frame of a long web of roll film 19 placed between a negative carrier 18 and a framing mask 20 so as to be kept flat in a printing position, is focused on a photographic paper 24 by means of a printing lens 23 to create a latent image of the picture frame of the film 19 under the control of a shutter 22 which is activated by a shutter control 21 to open for a certain exposure time.

The roll film 19 comprises a large number of negative films taken out from 35 mm-type patrons and connected in series to one another. Therefore, the roll film 19 usually includes a mixture of negative films with images inverted with respect to each other. The roll film 19 is wound around a film supply reel 24 and withdrawn, frame by frame, by means of take-up rollers 26 through a guide roller 25, and taken up around a take-up reel 28 through a guide roller 27.

The photographic paper 24 is wound around a paper supply reel 30 in a roll and taken up on a take-up reel 34 by means of guide rollers 31 and 33, and take-up rollers 32. Between the guide roller 31 and the take-up rollers 32, there is an exposure framing mask 36. In association with the exposure framing mask 36, there are attached a letter printing head 37 for erected images and a letter printing head 38 for inverted images.

Figure 3:
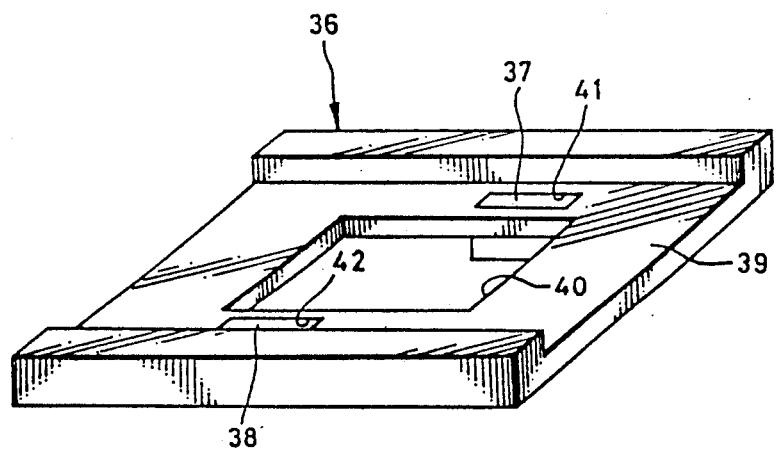
FIG. 3 is an illustration showing an exposure framing mask used in the photographic printer of FIG. 2.

Referring to FIG. 3, there is shown the exposure framing mask 36 of the photographic print of FIG. 2. As shown, the framing mask 36 is formed with an exposure aperture 40 defined by a rectangular opening at the center area thereof, and with a wide groove 39 for guiding the negative film 19. On both sides of the exposure aperture 40, there are formed rectangular openings 41 and 42 in which the letter printing heads 37 and 38 are fitted, respectively.

Figure 4:
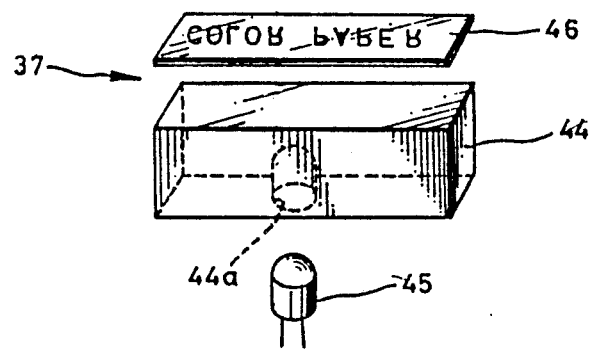
FIG. 4 is an exploded perspective view of a letter printing head incorporated in the exposure framing mask of FIG. 3.

As is shown in FIG. 4, the letter printing head 37 (which has the same structure and operation as the letter printing head 38) for erected images comprises a printing head block 44 formed with a blind bore 44a, a light source 45 (e.g., such as a light emitting diode) fitted within the blind bore 44a, and a letter plate 46 with letters indicating, for example, a trade name to be printed. The letter plate 46 is adhered to the printing head block 44 with appropriate adhesive materials. The printing head block 44 is preferably made of an acrylic transparent solid member with its outer walls painted black for preventing ambient light from passing there through. In order to prevent diffused reflections by the inner walls of the exposure aperture 40, it is preferred to attach nonwoven fabrics to the inner walls of the exposure aperture 40. The upper surface of the printing head block 44 to which the letter plate 46 is attached is finished as a matted surface for diffusing light. The letter plate 46 is preferably made of a lithographic film with transparent letters and, if desired, marks on a black ground. It is noted that the color of the printed letters depends upon the light emitting diode 45 used.

Figure 5:
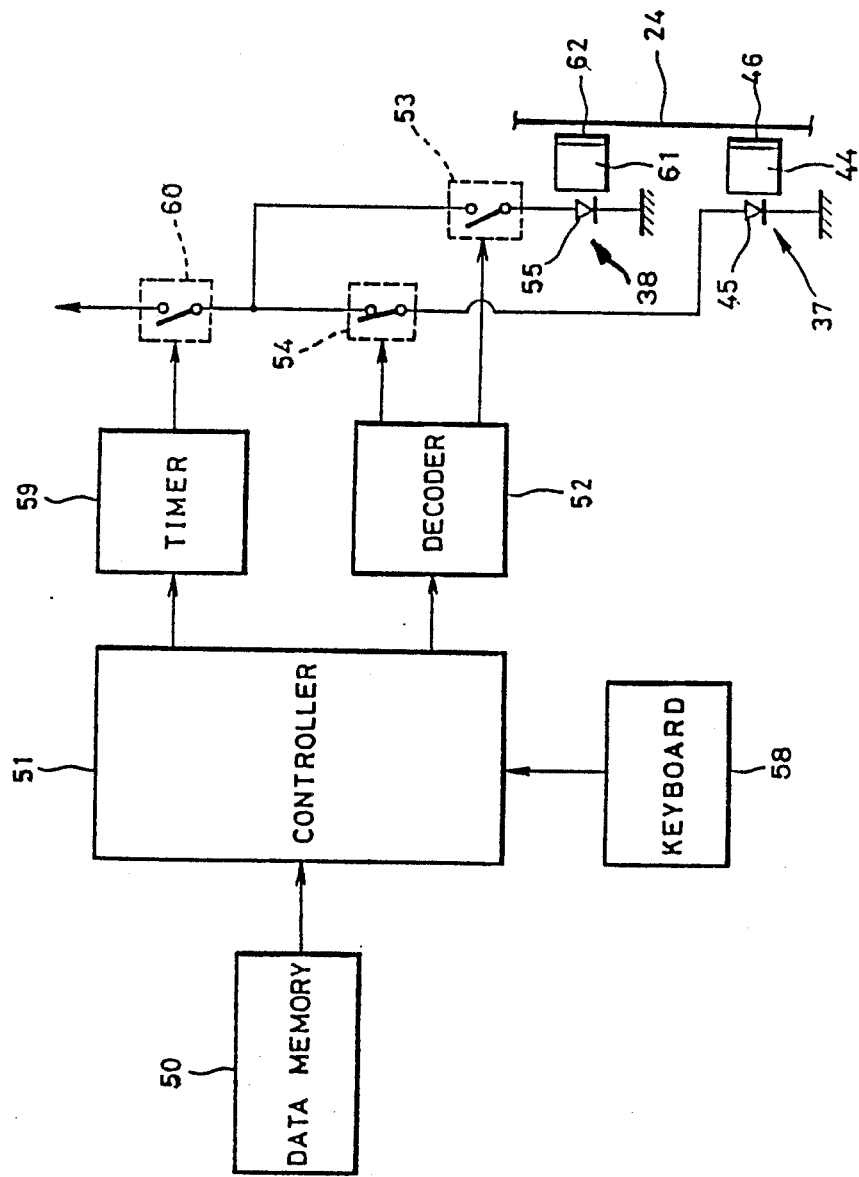
FIG. 5 is a functional block diagram showing a controller associated with the letter printing head of FIG. 3.

Referring to FIG. 5, there is shown a printer control circuitry for the letter printing head. For a data recording medium 50 serving as a printing data carrier, various kinds of recording materials, such as perforated paper tapes, magnetic tapes or magnetic floppy disks, may be used. The recording medium 50 contains various picture frame data relating to an exposure correction value, types of corrections, the number of prints and so forth for respective picture frames which are recorded by a negative inspector upon picture frame inspection. Further, the recording medium 50 carries data regarding the type of image, namely erected or inverted images. The data regarding the type of image corresponds to the picture frame data for a series of picture frames of each single negative film. Because ordinary negative films have erected negative images, it is convenient to provide a data recording button in the negative inspector for recording data on inverted images for a single negative film on the recording medium 50.

After the negative inspection of the film roll 19, the data recording medium 50 is set in the photographic printer. A controller 51 of the printer control circuitry reads out data representing an inverted negative image, and provides a decoder 52 with an instruction signal. The decoder 52 causes a switch 53 in association with the letter printing head 38 (i.e., the letter printing head for inverted images) to turn on (i.e. be closed) when receiving the instruction signal and, otherwise, a switch 54 in association with the letter printing head 37 is turned on.

The switch 53 is connected in series to the light emitting diode 55 provided in the letter printing head 38 and, on the other hand, the switch 54 is connected in series to the light emitting diode 45 provided in the letter printing head 37. When a printing instruction is entered into the controller 51 through a keyboard 58 connected to the controller 51, the controller 51 causes a timer 59 to count so as to allow a switch 60 to turn on for a period of time defined by the sensitivity of the photographic paper 24. The switch 60 is connected in series to both the light emitting diodes 45 and 55. Therefore, the switch 60 allows either the light emitting diode 45 or the light emitting diode 55 to be excited so as to emit light for the period of time counted by the timer 59 for projecting an image of the letters carried by the letter plate 62, 46 attached to the printing head block 61, 44 which is printed on the photographic paper 24 in a contact printing operation. It is to be noted that the letters on the letter plates 62, 46 are arranged in the opposite order with respect to each other.

In operation of the photographic printer according to the preferred embodiment of the present invention, the roll film 19 and the data recording medium 50 are set in the negative inspector for determining whether images formed on each negative film are erected or inverted. For negative films on which inverted images are formed, instruction data indicating an inverted image is recorded on the recording medium 50. After this determination, each picture frame is inspected to record exposure control data on the recording medium 50.

Before making prints from the roll film 19, the roll film 19 and the recording medium 50 are set in the photographic printer. When a printing instruction is entered through the keyboard 58, the roll film 19 is withdrawn to place the first picture frame thereof onto the negative carrier 18. Simultaneously, the controller 51 reads out posture data for the negative film including the first picture frame from the data recording medium 50. If images on the negative film 19 are inverted, the decoder 52 causes the switch 53 to turn on. The switch 53 is kept turned on for all the picture frames of the negative film.

The controller 51 then reads out exposure control data for the first picture frame from the data recording medium 50 and, with the read out exposure control data, the controller 51 corrects a basic exposure obtained based on a value measured by light measurement means (the operation and construction of the light measurement means is well known to those in the art and therefore a detailed description is unnecessary) which is disposed by the negative carrier 18 and measures light passed the picture frame in the negative carrier 18. According to the corrected exposure, the color filter 11-13 are inserted into the printing path 16 and then the lamp 10 produces light to its capacity so as to project an image of the picture frame of the roll film 19 onto the photographic paper 24 through the printing lens 23 while the shutter 22 opens for the determined period of time.

Simultaneously or before or after the printing of the picture first frame, the controller 51 actuates the timer 59 to turn on the switch 60 for the period of time according to the sensitivity of the photographic paper 24. Consequently, the light emitting diode 55 is excited through the switch 53 turned on so as to project an image of the letter plate 62 to which the photographic paper 24 in contact with the letter plate 62 is exposed.

After the print of the first picture frame, the roll film 19 is withdrawn by one frame to place the next picture frame in position in the negative carrier 18. Simultaneously, the photographic paper 24 is withdrawn by one frame from the supply reel 30 to place an unexposed part thereof in position over the framing mask 36. In such a way, the photographic paper 24 is exposed, frame by frame, and rounded around the take-up reel 34. After the completion of all the picture frames of a single negative film, the next negative film of the roll film 19 is placed in the negative carrier 18. In the same manner as previously described for the first single negative film, the controller 51 reads posture data for the next negative film from the recording medium 50. If images on the next negative film are erected, the decoder 52 causes the switch 54 to turn on, so that the light emitting diode 45 is allowed to be excited to project an image of the letter plate 46 onto the photographic paper 24 upon printing. On the other hand, if the images on the next negative film are inverted, the decoder 52 causes the switch 53 to turn on to project the image of the letter plate 62 onto the photographic paper 24.

Figure 6:
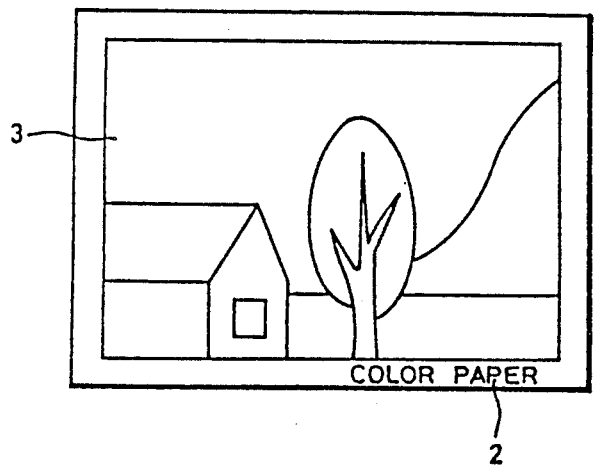
FIG. 6 is a top plan view showing a print with a letter image printed by the photographic printer of FIG. 2.
Figure 1:
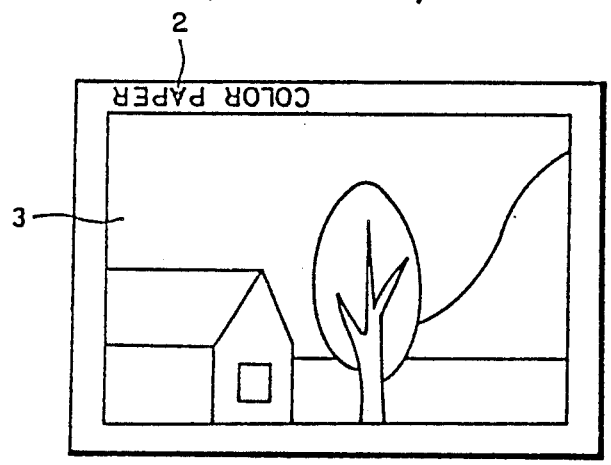
FIG. 1 is a top plan view showing a print with a letter image printed by a conventional photographic printer.

In any case, since the controller 51 selects the letter printing head 37 for erected images or the letter printing head 38 for inverted images, a letter positive image 2 of either the letter plate 46 or the letter plate 62 appears at the same place on a print 3 in the same posture as a picture of the print 3 as is shown in FIG. 6.

Negative films generally include picture frames with vertical images and picture frames with horizontal images. For these picture frames with vertical and horizontal images, another set of letter printing heads for erected and inverted images are provided adjacent to the opposite ends of the exposure aperture 40 of the framing mask 39. In this case, data regarding vertical or horizontal images is recorded on the data recording medium 50 for each picture frame upon image inspection and is read out to selectively excite one of the four letter printing heads upon printing. Although the letter image is pictured, in FIG. 6, as information of the type of photographic paper used, other letters or marks or numerical/letters such as a frame number, an exposure control mark or so forth may be printed.

The present invention can be applicable to print a frame number and/or an exposure control mark on the back of each print. In this case, two dot pattern printing heads for vertical and horizontal picture frames are provided in the photographic printer, in particular in the exposure framing mask, and selectively actuated according to image posture data read out from the data recording medium 50 to print a dot pattern number or mark from the back of the photographic paper 24. If an image on a picture frame is inverted, the image posture data read out from the data recording medium 50 is transformed so as to cause the dot pattern printer to project an inverted dot pattern. It is possible to automatically print frame numbers in a dot pattern on prints by reading frame numbers or codes applied to a side margin of a negative film for its respective picture frames which are read by means of a well known optical sensor.

What is claimed is:

1. A method for a photographic printer for printing images from a negative film onto a print, and for printing information from an information print head onto the print in the same posture as the posture of the printed image, the method comprising the steps of:
    providing a plurality of information printing heads in the photographic printer, each of said plurality of information printing heads being operable for printing information onto a print in a different posture; and
    selectively actuating that one of said plurality of information print heads which prints information in the same posture as the posture of the image to be printed onto the print, thereby providing a print having an image and information printed in the same posture.

2. The method according to claim 1, further comprising the steps of: storing data representing the posture of an image to be printed onto the print; and reading out the stored data corresponding to the image to be printed; and wherein said step of selectively actuating one of said information print heads includes selectively actuating one of said plurality of information print heads according to the read out posture data.

3. The method according to claim 1, further comprising the steps of: storing posture data representing whether the image to be printed is erected or inverted; and reading out the stored posture data corresponding to the image to be printed; and wherein said plurality of information printing heads include a first printing head for printing information in an erected posture, and a second printing head for printing information in an inverted posture, said first and second printing heads being selectively activated according to the read out posture data.

4. The method according to claim 1, wherein the photographic printer is operable for printing images from a web containing a plurality of negative films connected together in series, each of the negative films containing a plurality of images which are to be printed in a common posture, and further comprising the steps of: storing posture data representing the common posture of the images to be printed for each of the negative films; and reading out the stored data corresponding to the images of the negative film to be printed; and wherein said selectively actuating step includes selectively actuating one of said information heads according to the read out posture data.

5. The method according to claim 1, further comprising the steps of: storing posture data indicating whether the image to be printed is in a horizontal or a vertical posture, and posture data indicating whether the image to be printed is in an inverted or an erected posture; and reading out posture data corresponding to the image to be printed; and wherein the step of selectively actuating said plurality of information heads includes selectively actuating either a first information printing head for printing erected information in a horizontal posture, a second printing head for printing erected information in a vertical posture, a third printing head for printing inverted information in a horizontal posture, or a fourth information head for printing inverted information in a vertical posture according to the read out posture data.

6. A photographic printer for printing images from a negative film onto a print, and for printing information from an information print head onto the print in the same posture as the posture of the printed image, the printer comprising:
    a plurality of information printing heads disposed in the photographic printer, each of said plurality of information printing heads being operable for printing information on a print in a different posture;
    means for selectively actuating one of said plurality of information print heads so that the posture of the image to be printed on the print and the posture of the information to be printed on the print are the same.

7. The photographic printer according to claim 6, further comprising: means for storing posture data representing the posture of the image to be printed; and means for reading out the stored posture data of the image to be printed; and wherein said selectively actuating means selectively actuates one of said plurality of information heads according to the read out posture data.

8. The photographic printer according to claim 6, further comprising a framing mask for defining an exposure aperture, said plurality of information heads including a first information head and a second information head, said first and second information heads being formed in said framing mask and being arranged symmetrically with respect to the center of said exposure aperture.

9. The photographic printer according to claim 6, wherein said selectively actuating means comprises a plurality of switches, each of said plurality of switches being connected in series with a different one of said plurality of information heads.

10. A photographic printer for printing an image from a negative film onto a print, and for printing information on the print in the same posture as the printed image comprising:
   means for manually inputting data representing the posture of an image to be printed;
   memory means for storing said inputted data;
   a plurality of information printing heads for printing information on a print, each of said plurality of information printing heads being operable for printing information in a different posture; and
   a controller for reading the stored data from said memory means, and for selectively activating, according to the read out data, only that one of said plurality of information printing heads which prints information in the same posture as the image to be printed.

11. The photographic printer according to claim 10, further comprising first switching means, coupled to said controller, for actuating the selected information printing head.

12. The photographic printer according to claim 11, wherein said first switching means comprises a plurality of switches, each of said plurality of switches being connected to a different one of said plurality of information printing heads.

13. The photographic printer according to claim 11, further comprising: a timer coupled to said controller, and wherein said memory means includes data representing an exposure time for the negative film, said controller being operable for reading out said exposure time data for the negative film containing the image to be printed and for supplying the exposure time data to said timer, said timer being operable, in response to the read out exposure time data, for activating the selected information printing head for a period of time corresponding to said read out exposure time data.

* * * * *